3,322,814
PURIFICATION OF NITRILES
Vincent J. Iappelli, Lodi, N.J., assignor to Universal Oil Products Company, Des Plaines, Ill., a corporation of Delaware
No Drawing. Filed Sept. 10, 1964, Ser. No. 395,612
4 Claims. (Cl. 260—465.1)

This invention relates to the purification of nitriles and particularly to a process for the purification of water soluble nitriles by the removal of acrylonitrile therefrom.

Nitriles are valuable compounds having utility in many chemical fields. Frequently, however, nitriles exist in admixture with acrylonitrile which precludes their use in many applications where the presence of acrylonitrile is detrimental. Accordingly, to render nitriles suitable for such applications, it is necessary to remove the acrylonitrile therefrom.

The removal of acrylonitrile from nitriles, in particular water soluble nitriles such as acetonitrile, is not, however, readily effected by usual separational methods. This is especially the case when acrylonitrile is to be removed to a substantial extent where only very small quantities remain in admixture with the water soluble nitriles of the order of less than about 400 parts per million by weight. Distillation, for example, is not satisfactory because water soluble nitriles and acrylonitriles manifest a high degree of affinity for each other and because acrylonitrile is highly miscible with the water soluble nitriles. Moreover, separation of the acrylonitrile by other separational methods, especially to the extremely low levels of less than about 400 parts per million, generally involves such high cost that the separation becomes uneconomical to carry out.

It has now been discovered, however, that acrylonitrile can be removed from a water soluble nitrile mixture, and most importantly to very low levels, in a one-step treatment which is both simple and economical to carry out. These particularly desirable results are achieved according to this invention by treating a water soluble, nitrile mixture containing acrylonitrile with a treating compound capable of forming an insoluble material with acrylonitrile, separating insoluble materials from the resulting mixture, and thereafter recovering the substantially acrylonitrile-free, liquid portion of the resulting mixture.

Accordingly, it is an object of this invention to provide a process for removing acrylonitrile from water soluble nitriles. Another object is to provide a process for separating acrylonitrile from water soluble nitriles which is both simple and economical to carry out. A still further object is to provide a process for removing acrylonitrile from water soluble nitriles whereby substantially all of the acrylonitrile is removed.

In general, almost any water soluble nitrile can be effectively treated by the process of this invention to remove substantially all of the acrylonitrile therefrom. Such nitriles include, for example, acetonitrile, propionitrile, butyronitrile, valeronitrile or any mixtures thereof. The nitrile treated is contained in solution in mixture with the acrylonitrile. This mixture may contain other substances such as hydrogen cyanide, water, alcohol, ammonia or pyridine bases, but the presence of these materials does not interfere with the separation of the acrylonitrile according to the process of this invention.

In general, there is nothing critical about the quantity of acrylonitrile initially present in the mixture. However, the nitrile mixtures most advantageously treated by the process of this invention generally do not contain, initially, substantially more than about 5000 parts per million by weight of acrylonitrile. Other separational methods may be satisfactorily used to remove acrylonitrile to this level, but these other methods generally are not capable of satisfactorily removing the acrylonitrile to levels below this value, and especially not to levels below the order of about 400 parts per million by weight. It is for this reason that the nitrile mixtures treated by the process of this invention usually have initially only up to about 5000 parts per million of acrylonitrile. It is to be understood, however, that nitrile mixtures containing acrylonitrile above this level may be treated by the process of this invention, but from the standpoint of commercial feasibility the nitrile mixtures treated generally do not contain initially above about 5000 parts per million by weight of acrylonitrile.

As hereinbefore indicated, acrylonitrile is removed from a nitrile mixture according to this invention by treating the mixture with a treating compound capable of forming a material with acrylonitrile substantially insoluble in the mixture, separating the insoluble materials from the resulting mixture, and thereafter recovering the substantially acrylonitrile-free, liquid portion of the resulting mixture. Included within the group of treating compounds capable of forming an insoluble material with acrylonitrile which do not simultaneously form an insoluble material with the water soluble nitriles present in the mixture which may be used in the process of this invention to achieve the desired separation are compounds such as potassium or sodium permanganate. The preferred treating compound is potassium permanganate and the amount of potassium permanganate used in the process will vary and is dependent primarily upon the quantity of acrylonitrile initially present in the mixture with amounts ranging from about 0.25 to about 5 percent by weight of the nitrile mixture being satisfactory in most instances.

The separation of the acrylonitrile is effected in the process of this invention by virtue of its conversion to a material which is substantially insoluble in the nitrile mixture and which accordingly can readily be separated therefrom. Since the formation of this insoluble material, which is necessary for the separation, results from the interaction of the added treating compound, such as the preferred potassium permanganate, with the acrylonitrile, it is essential that the particular treating agent utilized not similarly interact with the water soluble nitriles present and thus also remove them from the liquid phase of the nitrile mixture.

The conditions under which the treatment of this invention is effected are not critical and may be widely varied with relatively comparable results. In general, the temperature utilized need only be sufficiently high, of the order of about 25° C. to insure adequate dissolving of the treating compound and adequate formation of the insoluble material by interaction of the treating compound and the acrylonitrile. Substantially elevated temperatures of above about 100° C. should be avoided, however, because at elevated temperature the insoluble material containing the acrylonitrile formed in the treatment becomes more soluble in the liquid phase of the nitrile mixture with the result that the desired degree of separation is adversely affected. The time required for the contacting of the nitrile mixture with the treating compound may be widely varied and is dependent primarily upon the degree of mixing and the quantities of acrylonitrile and treating compound present. The time of contacting, however, should be sufficiently long so as to permit adequate interaction of the added treating compound and the acetonitrile to form the substantially insoluble material whereby the separation is effected. Generally, contacting times of from about one to twenty-five hours will be satisfactory in most instances. The pressures employed must be sufficient to maintain the nitrile mixture in liquid phase at the particular treatment temperature utilized. However, since the temperatures are usually not substantially elevated, atmospheric pressures are, in most instances, satisfactory.

The process of this invention may be conducted in a batch, continuous or semicontinuous type of operation. The only essential requirement in conducting the process by any of these methods is that there be adequate contacting of the nitrile mixture with the treating compound so that the substantially insoluble material containing the acrylonitrile can form in the resulting mixture with the desired separation thereby being achieved. Preferably, a batch operation is utilized for the treatment and may be illustrated as follows: A water soluble nitrile mixture containing acrylonitrile is charged to a suitable vessel. The treating compound capable of forming a material with the acrylonitrile which is substantially insoluble in the nitrile mixture, such as the preferred potassium permanganate, is then added and mixed with the nitrile mixture. The temperature of the mixture is not critical and the simplicity of the process is typified by the fact that elevated temperatures need not be utilized, with ambient temperatures of initially about 25° C. being utilized. After the nitrile mixture and added treating compound have been stirred for a time sufficient to insure adequate contacting, the mixing is stopped and the resultant mixture is allowed to stand for a time sufficient for the insoluble material which has formed and which contains a major proportion of the original acrylonitrile to settle to the lower portion of the vessel. The liquid phase containing the nitrile which is now substantially free of the acrylonitrile is then recovered and separated from the insoluble material by ordinary means such as decantation or filtration.

The following detailed example is submitted for the purpose of illustrating a mode of carrying out the process of this invention. It is to be understood that the invention is not to be considered as limited to the specific conditions of operation set forth therein.

Example

About 1000 grams of an acetonitrile mixture containing acrylonitrile were charged to a vessel equipped with stirring means. While the mixture was stirred, about 20 grams of potassium permanganate were added. After completion of the addition, the mixing was continued for about 20 hours. Upon standing, insoluble materials which had formed during the mixing settled to the bottom of the vessel. The liquid phase was then separated from the solids by decantation and filtered to recover the acetonitrile mixture having a substantially reduced concentration of acrylonitrile. The results obtained were as follows:

| Material: | Concentration acrylonitrile parts per million by weight |
|---|---|
| Initial mixture | Above 3000 |
| Treated mixture | 360 |

I claim as my invention:

1. A process for removing acrylonitrile from a solution containing the same in admixture with at least one water-soluble nitrile selected from the group consisting of acetonitrile, propionitrile, butyronitrile and valeronitrile, which comprises treating said solution in liquid phase with potassium permanganate or sodium permanganate and reacting the permanganate in liquid phase with a major portion, at least, of said acrylonitrile to form with the latter a material which is insoluble in the nitrile solution, separating the resultant insoluble material from the solution, and recovering the liquid portion of the treated solution of reduced acrylonitrile content.

2. A process for removing acrylonitrile from a solution containing the same in admixture with acetonitrile, which comprises treating said solution in liquid phase with potassium permanganate and reacting the permanganate in liquid phase with a major portion, at least, of said acrylonitrile to form with the latter a material which is insoluble in the nitrile solution, separating the resultant insoluble material from the solution, and recovering the liquid portion of the treated solution of reduced acrylonitrile content.

3. A process for removing acrylonitrile from a solution containing from about 400 to about 5000 parts per million of acrylonitrile in admixture with at least one water-soluble nitrile selected from the group consisting of acetonitrile, propionitrile, butyronitrile and valeronitrile, which comprises treating said solution in liquid phase with from about 0.25 to about 5 percent by weight of potassium permanganate or sodium permanganate for a time period of from 1 to 25 hours and reacting the permanganate in liquid phase with a major portion, at least, of said acrylonitrile to form with the latter a material which is insoluble in the nitrile solution, separating the resultant insoluble material from the solution, and recovering the liquid portion of the treated solution of reduced acrylonitrile content.

4. A process for removing acrylonitrile from a solution containing from about 400 to about 5000 parts per million of acrylonitrile in admixture with acetonitrile which comprises treating said solution in liquid phase with from about 0.25 to about 5 percent by weight of potassium permanganate for a time period of from about 1 to 25 hours and reacting the permanganate in liquid phase with a major portion, at least, of said acrylonitrile to form with the latter a material which is insoluble in the nitrile solution, separating the resultant insoluble material from the solution, and recovering the liquid portion of the treated solution of reduced acrylonitrile content.

References Cited

UNITED STATES PATENTS 3,206,500   9/1965   Puls et al. _____ 260—465.1

CHARLES B. PARKER, *Primary Examiner.*

JOSEPH B. BRUST, *Assistant Examiner.*